(12) United States Patent
Parker

(10) Patent No.: US 6,814,903 B1
(45) Date of Patent: Nov. 9, 2004

(54) LOW-FIRING TEMPERATURE METHOD FOR PRODUCING $AL_2O_3$ BODIES HAVING ENHANCED CHEMICAL RESISTANCE

(76) Inventor: Gerard E. Parker, 1201 Colony Ct., Apt. 1, Zanesville, OH (US) 43701

( * ) Notice: Subject to any disclaimer, the term of this patent is extended or adjusted under 35 U.S.C. 154(b) by 159 days.

(21) Appl. No.: 10/092,080

(22) Filed: Mar. 6, 2002

Related U.S. Application Data

(63) Continuation-in-part of application No. 09/795,886, filed on Feb. 28, 2001.
(60) Provisional application No. 60/188,506, filed on Mar. 10, 2000.

(51) Int. Cl.⁷ .............................. C04B 33/32; B29C 9/00
(52) U.S. Cl. ......................... 264/13; 264/642; 264/650; 264/651; 264/671
(58) Field of Search ......................... 264/13, 642, 650, 264/651, 671, 670, 681, 660

(56) References Cited

U.S. PATENT DOCUMENTS

| | | | |
|---|---|---|---|
| 2,364,123 A | 12/1944 | Benner et al. .................. 23/208 |
| 3,955,942 A | 5/1976 | Cordon et al. ................. 51/295 |
| 4,017,587 A | 4/1977 | Ditter et al. ................. 423/291 |
| 4,052,538 A | * 10/1977 | Eddy et al. .................. 264/621 |
| 4,306,609 A | 12/1981 | Fischer et al. ................. 164/37 |
| 4,397,889 A | 8/1983 | Benjamin et al. ............. 427/221 |
| 4,456,484 A | 6/1984 | Benjamin et al. ............. 75/252 |
| 4,478,888 A | 10/1984 | Benjamin et al. ............ 427/220 |
| 4,668,644 A | 5/1987 | Filhol .......................... 501/119 |
| 4,767,449 A | 8/1988 | Rosen et al. ...................... 75/3 |
| 4,802,914 A | 2/1989 | Rosen et al. ...................... 75/3 |
| 4,804,525 A | 2/1989 | Rafaniello et al. .......... 423/291 |
| 4,832,895 A | 5/1989 | Johnson ..................... 264/29.1 |
| 5,175,132 A | 12/1992 | Ketcham et al. ............. 501/103 |
| 5,228,900 A | 7/1993 | Stephens et al. .............. 75/303 |
| 5,266,536 A | 11/1993 | Egerton et al. ............. 501/127 |
| 5,536,485 A | 7/1996 | Kume et al. ................. 423/446 |
| 5,605,883 A | 2/1997 | Iliff et al. ................... 510/444 |
| 5,654,094 A | 8/1997 | Patel et al. ................. 428/367 |
| 5,698,007 A | 12/1997 | Schmitt ....................... 75/772 |
| 5,876,793 A | 3/1999 | Sherman et al. ............ 427/213 |
| 2004/0049045 A1 * | 3/2004 | Hashimoto et al. ...... 546/273.7 |

* cited by examiner

Primary Examiner—Christopher A. Fiorilla
(74) Attorney, Agent, or Firm—C. John Brannon; Bingham McHale LLP

(57) ABSTRACT

A method for producing high-alumina bodies with superior chemical properties at reduced sintering temperatures, including the steps of providing an alumina powder precursor, adding about 4 weight percent magnesia powder precursor, homogenizing the resultant green powder precursor, pressing a green body from the green powder precursor, removing residual moisture and organic material from the green body, and firing the green body to about cone 13, wherein the resulting high-alumina body is substantially non-vitreous, has a substantially uniformly sized grain structure, is very resistant to dissolution in molten aluminum, and has superior resistance to chemical attack over substantially the entire pH range.

17 Claims, 6 Drawing Sheets

PROVIDE AN ALUMINA POWDER PRECURSOR

|

ADD ABOUT 1-10% MAGNESIA POWDER PRECURSOR AND 1-10% TITANIA POWDER PRECURSOR TO THE ALUMINA POWDER PRECURSOR TO MAKE A GREEN POWDER PRECURSOR

|

MIX THE GREEN POWDER PRECURSOR

|

PRESSING A GREEN BODY FROM THE GREEN POWDER PRECURSOR

|

REMOVING RESIDUAL MOISTURE AND ORGANIC MATERIAL FROM THE GREEN BODY

|

FIRING THE GREEN BODY IN AIR TO ABOUT CONE 13

FIG. 1

Provide an alumina powder precursor

|

Add about 1-10% magnesia powder precursor and 1-10% titania powder precursor to the alumina powder precursor to make a green powder precursor

|

Mix the green powder precursor

|

Pressing a green body from the green powder precursor

|

Removing residual moisture and organic material from the green body

|

Firing the green body in air to about cone 13

FIGURE 2

Some experimental data for a typical low-fired high alumina body

| | |
|---|---|
| Alumina Content | Low Firing Alumina Composition |
| Acid Resistant | Silica-Free Formulation |
| Starting Grain Size | ½ μm |
| Grain Growth | 1-3 μm (avg. 1.2 +/- 0.3 μm) |
| Material Preparation | Ball Milling, Spray Drying, Dry Pressing |
| Firing | Performed in Normal Atmosphere, Fiber-Lined Furnace, Fired to Cone 13 |
| Specific Gravity | 3.8 + (@ 1350°C) |
| Water Absorption | 0 |
| Thermal Conductivity @ 25°C (cal/cm$^2$/sec/°C) | 0.05 |
| Thermal Expansion @300 - 1000°C (/°C) | 8.3 x 10$^{-6}$ |
| Thermal Expansion Rate | Substantially Uniform – There is Negligible Thermal Expansion Mismatch Between the Matrix and Second Phase |
| Toughness, $K_{IC}$ | 4-5 Mpa·m$^{½}$ |
| Rockwell Hardness (45N) | >80 |
| Hardness (GPa) | 16 |
| Elastic Modulus | 365 Gpa |
| Flexural Strength (kpsi) | 47 |
| Compressive Strength (kpsi) | >300 |
| Tensile Strength (kpsi) | 25 |
| Dielectric Strength (v/mil) | 250 (open atmosphere) |
| Dielectric Constant @ 1 kHz | 8.2 |
| Dissipation Factor @ 1 kHz | 0.001 |
| Loss Factor @ 1 kHz | .01 |
| $T_c$ (°C) | >900 |
| Volume Resistivity @ 25°C | >10$^{14}$ |
| Surface Finish as Fired: Ground: | 10 rms ± 2 (typical sample) 5 rms ± 1 (typical sample) |

FIGURE 3

Long-Term Corrosion Study of Typical Low-Temperature High-Alumina (LTHA):

| MATERIAL | WEIGHT LOSS |
|---|---|
| ZTA | -70 percent |
| SiC/SiC | -30 percent |
| LTHA Sample | -30 percent |

Materials Corrosion Test:
Independent Test

Weight loss in mg/dm$^2$/day 46.7% Hydrofluoric (HF) acid @ 25°C

| | 5 day immersion | 35 day immersion (30 after 5) |
|---|---|---|
| SiC-Silica Free | 1.00 | 1.00 |
| ZrO$_2$-Toughened | 1110.00 | 1070.00[1] |
| Al$_2$O$_3$ – 99.9% | 1.92 | 2.26 |
| LTHA Sample (Membrane-approx. 36% porosity) | 1.0 | 0.16[2] |
| LTHA Sample (Solid) | 1.64 | 0.09 |

NOTE: Weight loss is listed in mg/dm$^2$/day rounded to nearest 0.01 g.

(1): Approximately 2/3 of the coupon was destroyed in 35 days of testing.
(2): This is a rather severe test in that the surface area is approx. 36% greater than the normal as tested.

Materials Corrosion Test:

50% H$_3$PO$_4$ @ 25°C

Cum. Mg/dm$^2$ (approx.)

| | 24 Hours | 120 Hours |
|---|---|---|
| AD90 | 5.35 | 9.65 |
| AD94 | 2.72 | 5.00 |
| AD96 | 4.82 | 12.54 |
| ADO96 | 5.61 | 11.59 |
| AD99.5 | 6.75 | 10.26 |
| TTZ | 0.88 | 3.33 |
| LTHA Sample | 1.66 | 2.02 |

FIGURE 3 (continued)

30% NaOH @ 25°C

Cum. Mg/dm² (approx.)

| | 24 Hours | 120 Hours |
|---|---|---|
| AD90 | 24.98 | 51.15 |
| AD94 | 15.24 | 32.27 |
| AD96 | 2.13 | 6.10 |
| ADO96 | 11.59 | 14.61 |
| AD99.5 | 8.23 | 12.20 |
| TTZ | 0.61 | 0.61 |
| LTHA Sample | 1.72 | 2.01 |

NOTE: Weight loss is mg/dm²/day, rounded to nearest 0.01g.

Materials Corrosion Test:

Weight loss in mg/cm²/day

| | 60% $H_3PO_4$ @ 60°C | 30% NaOH @ 60°C |
|---|---|---|
| A479 $Al_2O_3$ (90%) | 0.15 | 0.28 |
| A479SS $Al_2O_3$ (99.5%) | 0.07 | 0.12 |
| 3$NaI_2O_3$ (99.9%) | 0.02 | 0.00 |
| LTHA Sample | 0.00 | 0.00 |

NOTE: Weight loss is mg/cm²/day, rounded to nearest 0.01g.

High Alumina Corrosion Test:
Independent Test

| CORROSIVE SOLUTION | HCl | $HNO_3$ | $H_2SO_4$ |
|---|---|---|---|
| MATERIAL | % WEIGHT LOSS | | |
| Product of Manufacturer A: | | | |
| 85% $Al_2O_3$ | 0.066 | 0.076 | 0.066 |
| 96% $Al_2O_3$ | 0.081 | 0.087 | 0.200 |
| LTHA Sample | (No Detectable Loss) | | |
| Product of Manufacturer B: | | | |
| 99.5% $Al_2O_3$ | 0.217 | 0.163 | 0.216 |

PROCEDURES

1. Check the initial weight (approximately 5 grams)·
2. Immerse into high concentration acid/base solutions
3. Dilute with 50 volume % of distilled water
4. Boil for an hour, and let soak overnight
5. Check the final weight
6. Calculate percent weight loss

% LOSS=(INITIAL WEIGHT – FINAL WEIGHT) / INITIAL WEIGHT

FIGURE 4

Summary of Typical Low-Temperature High-Alumina Material Thermal Spray Features:

| | | APPLICATION METHOD | |
|---|---|---|---|
| | | Subsonic Plasma | HVOF |
| Deposit Efficiency (DE) | | 85+% | 75+% |
| Lay-Down Rate (surface speed = 1200 ipm) | | 4+mil/pass | 1+mil/pass |
| Hardness (as applied) | Rockwell | 90+ | 94+ |
| | Vickers | 1,100+ | 1300+ |
| Surface Roughness (as applied) | | 200 – 300 μin. | 60 – 80 μin. |
| Dielectric Strength | | 450+v/mil | 950+v/mil |
| Bond Strength | | 10,000 – 12,000 psi | |
| Porosity (by optical microscopy) | Interconnected Surface | 0% < ½ μin. | |

Properties of LTHA Coating

| | | APPLICATION METHOD | |
|---|---|---|---|
| | | Subsonic Plasma* | HVOF** |
| Deposit Efficiency (DE) | | 85.5% (82 - 91) | 74% (65 - 83) |
| Lay-Down Rate (mil/pass) (surface speed = 1200 ipm) | | 3.5 (2 - 4.2) | 0.98 (0.87 – 1.03) |
| Hardness (as applied) | Rockwell Std. Dev. | 90.1 (88.9 – 91.7) 1.4 | 94.3 (94.1 – 94.7) 0.4 |
| Surface Roughness (as applied) | | 200 – 300 μin. | 60 – 80 μin. |
| Dielectric Strength | | 450+v/mil | 950+v/mil |
| Bond Strength | | 10,000 – 12,000 psi | |
| Porosity (by optical microscopy) | Interconnected Surface | 0% < ½ μin. | |

\* These averages are based on 132 sample coupons, randomly picked for testing out of approximately 30 spray runs containing 8 – 10 coupons per run.

\*\* These averages are based on 30 sample coupons, randomly picked for testing out of approximately 10 spray runs containing 8 – 10 coupons per run.

( ) Indicates ranges of high and low values.

FIGURE 5

Tensile Test Data for 6061 Matrix Composites at 15v% (Test One)
(NOTE: This test conducted with non-spherical grain)

| Material | H.T. Condition | Elastic Modulus (Msi) | Yield Strength (ksi) | Ultimate Strength (ksi) | Strain at Failure (%) |
|---|---|---|---|---|---|
| 6061 (avg.) | T – 6 | 9.9 | 40 | 45 | 10 |
| LTHA Sample | T – 6 | 12.9 | 53 | 65 | 7 |
| Tabular Al₂O₃ | T – 6 | 12.9 | 53 | 65 | 7 |

Tensile Test Data for 7093 Matrix Composites at 15v% (Test Two)

| Material | H.T. Condition | Elastic Modulus (Msi) | Yield Strength (ksi) | Ultimate Strength (ksi) | Strain at Failure (%) |
|---|---|---|---|---|---|
| 7093 (avg.) | T – 6 | 10.3 | 92 | 95.6 | 13.4 |
| LTHA Sample | T – 6 | 13.1 | 80 | 85 | 0.9 |
| Tabular Al₂O₃ | T – 6 | 13.4 | 58 | 67 | 4.2 |
| B₄C | T – 6 | 14.6 | 84 | 98 | 2.6 |

Tensile Test Data for 7093 Matrix Composites at 10v% (Test Three)

| Material | H.T. Condition | Elastic Modulus (Msi) | Yield Strength (ksi) | Ultimate Strength (ksi) | Strain at Failure (%) |
|---|---|---|---|---|---|
| 7093 (avg.) | T – 6 | 10.3 | 92 | 95.6 | 13.4 |
| LTHA Sample | T – 6 | 12.2 | 82.5 | 90.0 | 3.7 |
| B₄C (96 samp.) | T – 6 | 13.2 | 89 | 96.7 | 4.1 |

Thermal Expansion Coefficient: 10 ppm/°F (Al = 13 ppm/°F)

Friction and Water Data:

| Composite ID | Coefficient of Friction | | Volume loss from Block ($10^{-3}$ cu cm) |
|---|---|---|---|
| | Start | Finish | |
| 20v% SiC/2124 | .096 | .119 | 6.34 |
| 25v% SiC/2124 | .101 | .123 | 6.23 |
| 30v% SiC/2124 | .098 | .119 | 4.15 |
| 20v% SiC/7091 | .101 | .--- | 6.31 |
| SPF-251 Std Coating | .141 | .129 | 13.11 |

Test Results of 7093/Al₂O₃/xxp Composite

| Sample | Vol. % | YS 0.2% (ksi) | UTS (%) | Elongation (Msi) | Modulus |
|---|---|---|---|---|---|
| Baseline T – 6 | 0 | 85.7 | 96.5 | 22.4 | 10.6 |
| Tabular Al₂O₃ T – 6 | 15 | 58.0 | 67.0 | 4.2 | 14.1 |
| Medialox C25CR | 10 | 25.1 | 33.9 | 2.43 | --- |
| Duralox DF500 | 10 | 36.5 | 48.7 | 7.56 | --- |
| Baikalox GE6 | 10 | 24.9 | 37.0 | 4.53 | --- |
| LTHA Sample Lot 1 T – 6 | 15 | 84.3 | 86.2 | 0.9 | 13.5 |
| LTHA Sample Lot 2 T – 6 | 10 | 82.5 | 89.6 | 3.7 | 12.2 |

LOW-FIRING TEMPERATURE METHOD FOR PRODUCING $AL_2O_3$ BODIES HAVING ENHANCED CHEMICAL RESISTANCE

REFERENCE TO RELATED APPLICATION

The present application is a continuation-in-part utility patent application of U.S. patent application Ser. No. 09/795,886, filed Feb. 28, 2001 which in turn is based upon Provisional application Ser. No. 60/188,506, filed Mar. 10, 2000.

TECHNICAL FIELD OF THE INVENTION

The present invention relates generally to a method for forming high-alumina bodies, and, more particularly, to a method for sintering high alumina bodies having superior properties and at reduced temperatures.

BACKGROUND OF THE INVENTION

Alumina (also known as $Al_2O_3$ or corundum) is a useful and ubiquitous ceramic material. Alumina is a very hard crystalline material. It has a structure that may be described as a hexagonal close-pack array of oxygen atoms with metal atoms in two-thirds of the octahedrally coordinated interstices. Each metal atom is thus coordinated by six oxygen atoms, each of which has four metal neighbors (6:4 coordination). Alumina products include abrasives, insulators, structural members, refractory bricks, electronic substrates, and tools. Alumina is stable, hard, lightweight, and wear resistant, making it attractive for such applications as seal rings, air bearings, electrical insulators, valves, thread guides, and the like, as well as the ceramic reinforcing component in metal matrix composites.

Alumina is produced on an industrial scale using the Bayer Process to separate ferric oxide, silica and aluminum oxides. Bauxite ore is ground finely then treated with sodium hydroxide (NaOH) in an iron autoclave at an elevated temperature. The alumina dissolves as sodium aluminate via the equation:

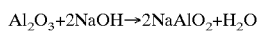
$$Al_2O_3 + 2NaOH \rightarrow 2NaAlO_2 + H_2O$$

The silica dissolves to form sodium silicate but the ferric oxide, being insoluble, is filtered off. Carbon dioxide is then passed through the solution, decomposing the sodium aluminate ($NaAlO_2$) to form aluminum hydroxide and sodium carbonate:

$$2NaAlO_2 + CO_2 \rightarrow Na_2CO_3 + \downarrow 2Al(OH)_3$$

The aluminum hydroxide is separated by filtration and calcined at 1000° C. or higher, when it loses its water of constitution, yielding alumina:

$$2Al(OH)_3 \rightarrow Al_2O_3 + 3H_2O$$

Pure crystalline alumina is a very inert substance and resists most aqueous acids and alkalis. It is more practical to use either alkaline (NaOH) or acidic ($KHSO_4$, $KHF_2$, etc) melts. Concentrated boiling sulfuric acid also can be used as an etchant.

In order to produce useful bodies, alumina must be densified or sintered. Sintering is the process in which a compact of a crystalline powder is heat treated to form a single coherent solid. The driving force for sintering is the reduction in the free surface energy of the system. This is accomplished by a combination of two processes, the conversion of small particles into fewer larger ones (particle and grain growth) and coarsening, or the replacement of the gas\solid interface by a lower energy solid\solid interface (densification). This process is modeled in three stages:

Initial—the individual particles are bonded together by the growth of necks between the particles and a grain boundary forms at the junction of the two particles.

Intermediate—characterized by interconnected networks of particles and pores.

Final—the structure consists of space-filling polyhedra and isolated pores.

The kinetics of sintering tend to be temperature sensitive, such that an increase in sintering temperature generally substantially accelerates the sintering process. In industrial applications, while an increase in sintering temperature decreases sintering time and increases throughput, the economic gains therefrom are offset by increased fuel costs and decreased furnace life (since higher firing temperatures result in more rapid degradation of both the furnace refractory structure and heating elements.) Therefore, an economically optimum sintering temperature is one that best balances gains from throughput with losses from fuel and furnace wear and tear.

The sintering of alumina at temperatures above 1600° C. is generally required to achieve a high density, and alumina is commonly sintered in the temperature range of 1700–1800° C., since higher temperatures promote more rapid sintering. Sintered alumina bodies reflect the properties of the constituent alumina crystallites or grains, such that they are hard, tough, substantially inert, and resistant to chemical attack (such as dissolution, corrosion and/or degradation from acid or alkaline agents). Mechanical and/or chemical failure of sintered alumina bodies usually occurs as a grain boundary phenomenon. Since the grain boundaries usually contain porosity and a glassy phase, a sintered alumina body is not as hard, tough, inert, and/or chemically resistant as a comparable single crystal alumina body.

One increasingly important use of alumina is as a ceramic phase dispersed in a metal matrix to form a metal matrix composite (MMC). MMCs exhibit properties of both the metal matrix and the dispersed ceramic phase, such that they have the toughness and ductility of the metal matrix combined with the compression strength and vibration dampening characteristics of the dispersed ceramic phase. Since MMCs are true composites, the ceramic phase is merely suspended in the metal matrix and not alloyed therewith. One problem with the production of MMCs is that the metal matrix, if heated to the point of melting, is generally corrosive to the ceramic phase. It therefore is generally necessary to either use more expensive powder metallurgical processing techniques to form MMCs or to very finely control the time during which the molten metal is in contact with the ceramic phase. Contact between the molten metal and the ceramic phase tends to degrade the ceramic phase, resulting in a reduction of the desired ceramic phase and the formation of a region of uncontrolled composition (such as uncontrolled alloying and/or oxide formation) around the remaining (if any) ceramic particles. Degradation of the ceramic phase accordingly results in uncontrolled degradation of the physical and chemical properties of the MMC material, such as a reduction of the toughness, strength and ductility of the MMC. This problem is especially acute if the matrix metal is aluminum, as molten aluminum is very corrosive.

Another problem with MMCs in general and aluminum-based MMCs in particular arises from the difficulty in making a joint in the material without degrading the ceramic phase and weakening the MMC. Typical welding processes form a weld pool of molten metal wherein two pieces may be alloyed together to form a weld joint. In the case of welding an MMC, degradation of the ceramic phase by the molten metal in the weld pool typically produces an undesired contaminant in the weld pool of variable and uncontrolled composition. The presence of the contaminant makes welding difficult, and weakens and embrittles the weld joint material such that catastrophic failure of the part is much more likely to occur at the joint, provided it was possible to form a joint at all. Typical aluminum-based MMCs exhibit degradation of the alumina particles when heated above about 300 degrees Fahrenheit, since solid-state diffusion processes begin to occur between the alumina particles' grain boundary phases and the aluminum matrix well below the melting point of aluminum. While some more exotic welding techniques, such as high energy x-ray welding have shown promise in the joining of MMCs, they require relatively rare and expensive synchrotronic x-ray sources.

There is therefore a need for a technique for decreasing the sintering temperature of alumina without sacrificing throughput (increasing the sintering time) or quality. There is also a need for producing sintered alumina bodies having bulk physical characteristics closer to those of single-crystal alumina, such as resistance to dissolution in aluminum metal. The present invention addresses these needs.

SUMMARY OF THE INVENTION

One form of the present invention relates to substantially non-vitreous high-alumina bodies formed through a low-temperature sintering process. The high-alumina bodies so produced have a substantial resistance to dissolution in molten aluminum and are thus ideal for use as the ceramic oxide component in an aluminum-based metal matrix composite. The effective sintering temperature for a given sintering time required to achieve substantially full densification of the alumina particles was decreased through the addition of quantities of magnesia to the alumina precursor powders. The resulting substantially fully dense high-alumina bodies exhibited superior resistance to chemical attack over a broad range of pH and temperature conditions.

One object of the present invention is to provide a method for producing substantially dense high-alumina bodies at lower sintering temperatures when sintered for comparable times. Related objects and advantages will become apparent from the following description.

BRIEF DESCRIPTION OF THE DRAWINGS

FIG. 1 is a flow chart schematically representing the processing steps of the present invention.

FIG. 2 is a table illustrating some of the physical properties of high-alumina material made by the process of FIG. 1.

FIG. 3 is a table presenting the results of exposure of the high-alumina material made by the process of FIG. 1 to various hostile chemical environments.

FIG. 4 is a table presenting some properties of thermal spray coatings of the high-alumina material of FIG. 1.

FIG. 5 is a table presenting some properties of metal matrix composites made from the low-fired high-alumina material of FIG. 1

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Known Methods of Decreasing the Firing Temperature of Alumina

To promote the rapid densification of $Al_2O_3$, additives such as CaO, MgO and $TiO_2$, as well as titanates of baria and strontia, have frequently been used. The effect of these additives is sensitive to certain experimental or production procedures, including the fabrication history of the $Al_2O_3$ powder, the amount of additives (especially MgO), the sintering temperature, type and concentration of impurities, and so on. The effectiveness of known methods of densification is also a function of the purity alumina and additives. Densification generally increases as a function of purity.

MgO is known in the art to act to retard grain growth or, more precisely, to restrict the mobility of grain boundaries. Two categories of grain boundaries can be distinguished: those that intersect pores and are therefore active in densification (type A) and those that are entirely connected to other grain boundaries (type B). The existence of type B boundaries is due to inhomogeneties in the original powder compaction of the green body. Densely packed regions of the green compact undergo local densification, leading to the development of dense, pore-free regions upon firing in an otherwise porous microstructure. These dense regions will be better able to support grain growth because of the drag exerted by porosity is absent.

The effect of MgO is limited to the increase in the grain boundary area. MgO alone has no effect on the pore surface area. The raising of the grain boundary area can be interpreted as being due to the inhibition of grain growth in the densified regions, i.e. the grains remain small. The function of the additive is to restrain grain growth in the densely packed regions until the less densely packed regions have an opportunity to density. MgO can be thought of as acting as a homogenizer of the microstructure, in that MgO smoothes out the consequences of inhomogeneity.

The mechanism by which MgO aids in densification has been a source of contention in the known art. Generally, two mechanisms have been considered: pore mobility and grain boundary mobility. The contention arises from (including but not limited to) the nature and amount of impurities, experimental regimen and sintering atmosphere. One possible densification mechanism is that MgO increases the surface diffusion kinetics and thus increases pore mobility. The resultant high pore mobility keeps pores on the migrating grain boundaries during the final stages of sintering. Other mechanisms such as solute segregation at the grain boundaries and second phase pinning of grain boundaries may have been proven untenable, but the data may not be conclusive and they are being mentioned because they describe interesting sintering phenomenon.

Another sintering aid known to be effective in the densification of alumina is $TiO_2$. Additions of $TiO_2$ to alumina have resulted in more rapid sintering relative to pure alumina. For additions of titania as the only sintering additive, the rate of initial sintering generally increases approximately exponentially with titania concentration up to a percentage beyond which the rate of sintering remained constant or decreased slightly. The concentration, which produces the maximum rate of sintering, is thought to be the solubility of $TiO_2$ in $Al_2O_3$. For alumina particles larger than 2 μm in initial stage sintering experiments with temperatures of 1520° C. and 1582° C., the kinetic process was mainly grain boundary diffusion. For smaller particles (less than 1 μm) in initial stage sintering experiments with temperatures ranging from 1150° C. to above 1400° C., volume diffusion dominated. For particles with sizes between the two, sintering occurred by a combination of the two kinetic mechanisms. It should be noted that the above details are for initial stage sintering wherein a maximum density of about 85% was achieved.

Fine-grained alumina bodies of about 95% theoretical density were achieved by sintering green alumina bodies with 2 wt. % additions of low melting point additives at 1400° C. Silicate additions were used because they form a liquid phase during the firing cycle. Silicate fluxes were prepared using MgO and CaO and in long firing regimens (15–17 hours) under an argon atmosphere with temperatures ranging from 1320° C. to 1430° C., theoretical densities of 93–96% were achieved with the MgO flux.

Forming Dense High-Alumina Bodies

The present invention relates to a method for producing dense bodies having a high-alumina content from powder alumina precursors. More particularly, the present invention relates to a technique for the sintering of high-alumina bodies at lower temperatures to form dense high-alumina bodies having superior physical properties, as shown schematically in FIG. 1. In general, the first step in the low-temperature production of high-alumina bodies is to blend a high-alumina green powder. The high-alumina green powder is blended from calcined alumina powder, with additions of about 1–10 wt. magnesia (or a magnesia-former standardized to about 1–10 wt. % magnesia) and about 1–10 wt. % titania. The magnesia addition may be conveniently achieved through the addition of a magnesia-former, such as $MgCO_3$, the firing of which readily forms magnesia upon heating according to the relation:

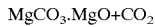

For the convenience of the reader, "magnesia" hereinbelow will be taken to refer to both MgO and any MgO forming material standardized to produce MgO. Likewise, "titania" will refer to $TiO_2$ and any $TiO_2$ forming material standardized to produce $TiO_2$. Preferably, about 4 wt. % additive mixture is added to the calcined alumina powder to constitute the green precursor. Also preferably, the ratio of magnesia to titania in the additive portion is about 50:50, and more preferably the ratio is about 42:58. The precursor powders are preferably mixed by wet ball milling with alumina media, although any convenient ceramic powder mixing technique may be chosen. Also, binder phase such as carboxymethylcellulose (CMC), may be added to the green powder, depending upon the requirements of the pressing and firing parameters necessary to produce the desired high-alumina body.

The dried green powder is then sieved and formed into a green body having the desired shape. The green body is then baked to remove excess moisture and the binder phase (if any) and then fired. Preferably, the alumina body is fired in air to about cone 13 to achieve full sintering and densification. It should be noted that the cone system of measurement combines firing time and temperature to achieve what is essentially a measure of a system's energy state, i.e. the energy at which a cone of a standard size and shape configuration and having a specific, predetermined composition softens and deforms. A cone designation is therefore a specific measure of the energy put into the system during the firing process, and not merely a minimum measure. For example, cone 13 is roughly analogous to firing to about 1250° C. for about 2 hours. The baking and firing phases may be performed separately, or as part of one continuous process.

One alternative to the firing step is passing the green particles through a heat source, such as a flame or laser. If the green particles are rapidly passed through a sufficiently intense hot zone, rapid sintering may be induced. Moreover, if the green particles are passed through the hot zone under weightless or quasi-weightless conditions (such as aspiration), surface tension effects from the molten binder phase will cause the heated particles to take on a substantially spherical shape and/or donut-shape as they sinter. These spherical particles, or beads, appear optically transparent or translucent, indicating that they may be partially or substantially amorphous in character. In other words, the beads formed as discussed above may be somewhat or substantially completely vitreous alumina.

Preferentially, CMC in a 3% aqueous solution is used as the binder. In other contemplated embodiments, other convenient organic binders may be used. Likewise, while the preferred concentration of CMC is 3% in aqueous solution, any convenient concentration of CMC capable of producing a crushable solid residue may be chosen.

The purity of the green powder precursor materials are not critical to the present invention, although if the production of a highly pure high-alumina body is desired, the use of high purity green powder precursor materials may likewise be desirable. If the purity of the resultant high-alumina bodies is not a consideration, green powder precursors of any desired purity level may be selected.

In the preferred embodiment, the calcined alumina precursors were chosen from powders having a particle size of about 1 micron or less, but precursor particles of any convenient size may be selected. The low-temperature high-alumina sintering process of the present invention is not especially sensitive to precursor particle size, with the size of the precursor particles primarily influencing slurry mixing conditions and green body pressing/forming parameters. However, it is generally preferable for the mean particle size of the additives to be about equal to or smaller than that of the calcined alumina.

Properties of Low-Fired High-Alumina Bodies

FIG. 2 is a table illustrating the basic physical properties of low-fired high-alumina material made by the above process, while FIG. 3 is a table showing the effects of various hostile chemical environments of the same low-fired high-alumina material. In addition, high-alumina bodies produced by the above process have a number of interesting properties, including: substantially full density; increased resistance to chemical attack over a very broad pH range; the substantial absence of a secondary glassy phase (i.e., they are non-vitreous); substantially uniform and linear thermal expansion; optical translucence; high-temperature corrosion resistance; and substantially uniform grain size.

Of particular interest is the pH range over which the low-fired high-alumina material is resistant to chemical attack, as illustrated in FIG. 3. Bodies made of the low-fired high-alumina material have been subjected to pH conditions ranging from extremely alkaline (concentrated NaOH with a pH of about 13.5) to extremely acidic (concentrated HF, $H_2SO_4$ and hot $H_2$ gas, an effective pH of about 0.3 or less) with minimal corrosive effects. The high-alumina bodies are even resistant to dissolution and/or corrosion from prolonged immersion in molten aluminum.

Moreover, the above process produces high-alumina pieces having a very low rate of defect, allowing net shape formability through conventional green body forming and firing means. Further, the high-alumina pieces formed by the above process consistently exhibit a superior surface finish of about 8 rms. The savings (both in energy costs and increased furnace life), the uniform and linear thermal expansion, substantially uniform grain size, low defect rate, and superior surface finish make the formation of low-fired high-alumina material by the above process very attractive from a manufacturing standpoint. Low-fired high-alumina bodies of the do not require kiln furniture or spacers for separation and may be stacked directly in contact with one another for firing without risking fusing or other firing defects.

Low-Fire High-Alumina Spray Coatings

Low-fired high-alumina material made by the above process may also be applied as a thermal spray material coating via techniques such as subsonic plasma coating or high velocity oxygenated fuel (HVOF) means. Thermal spray coatings of a low-fired high-alumina material of the present invention provide a tough ceramic wear resistant and corrosion resistant coating layer suitable for mechanical or electronic applications without sensitivity to the application technique. FIG. 4 tabulates some of the properties of low-fired high-alumina thermal spray coatings.

Metal Matrix Composites Containing Low-Fired High-Alumina Materials

FIG. 5 presents some properties of metal matrix composite (MMC) materials made using the low-fired high-alumina material of the present invention (in spherical form) as a reinforcement phase. In this embodiment, the metal matrix was aluminum, although any convenient metal matrix may be reinforced using the present low-fired high-alumina material. The high resistance to dissolution in molten aluminum exhibited by the present low-fired high-alumina material allows MMCs made therefrom to be made by a casting process instead of the more expensive cold pressed powder metallurgical process. In addition, MMCs made with the present low-fired high-alumina material enjoy the advantages of enhanced welded joint integrity, an expanded heat treatment range and a higher manufacturing throughput.

In particular, MMCs having the particles of the present low-fired alumina suspended in an aluminum matrix may be welded using any common welding technique, such as MIG (gas metal arc) or TIG (gas tungsten arc) welding techniques, without substantial degradation of the suspended low-fired alumina particles. This allows for the production of welded joints enjoying the same physical property benefits of the suspended alumina particles as the rest of the MMC instead of suffering from weakness and embrittlement. Typically, the alumina is present as a particulate secondary phase dispersed in a metallic matrix in amounts ranging from about 5 to about 25 weight percent, with the amount of dispersed alumina preferably being about 15 weight percent.

Another embodiment of the present invention relates to a high-alumina material and a method for producing the same. The high-alumina material of this embodiment is a dense, substantially non-vitreous alumina formed at relatively lower sintering temperatures. The high-alumina material is formed from a high-alumina blend green powder. The high-alumina blend green powder is preferably blended from calcined alumina powder, with additions of about 1–10 weight percent magnesia (or a magnesia form or standardized to about 1–10 weight percent magnesia). The magnesia addition may be conveniently achieved through the addition of a magnesia former, such as $MgCO_3$, which readily forms magnesia upon firing according to the relation:

$MgCO_3 \cdot MgO+CO_2$

Preferably, about 2–6 weight percent magnesia is added to the alumina powder to constitute the green powder precursor. More preferably, about 4 weight percent magnesia mixture is added to the alumina powder to constitute the green powder precursor. Alternately, the green precursor may be formed as a slurry or by any other convenient green ceramic processing technique. The precursor powders are preferably mixed by wet ball milling with alumina media, although any convenient ceramic powder mixing method may be selected.

A binder paste, such as CMC, may be added to the green powder precursor, depending on the requirements of the pressing and firing parameters necessary to produce the desired high alumina body.

A green powder precursor may be produced by drying and sieving the milled material. The dried green powder may be formed into a green body by any convenient ceramic forming technique, such as dryer isostatic pressing. The formed green body is then baked to remove excess moisture and any binder paste present. The baked green body may then be fired. Preferably, the baked green body is fired in air to about cone 13 to achieve full sintering intensification. The baking and firing phases may be performed separately, or as part of one continuous process.

If a high-density alumina powder is required, such a powder may be achieved by firing the loose green powder to cone 13, as described above regarding green bodies, or, alternately, passing the green particles through a high intensity heat source, such as a flame or laser. The alumina powder so formed exhibits the properties of resistance to chemical attack over substantially the entire pH range (at least from about 0.3 to about 13.5). Rapid passage of the green particles through a sufficiently intense hot zone facilitates rapid sintering of the alumina. Additionally, if the green particles are rapidly passed through the hot zone under weightless or quasi-weightless conditions (such as aspiration), surface tension effects from the molten binder phase will cause the heat particles to take on a substantially spherical shape as they sinter. These spherical particles, or beads, appear optically transparent or translucent, indicating that they may be partially or substantially amorphous in character. In other words, the beads formed as discussed above may be somewhat or substantially completely vitreous alumina.

If a binder phase is required, the three percent (3%) aqueous solution of CMC is preferred. In other contemplated embodiments, other convenient organic binder solutions may be considered. Likewise, while the preferred concentration of CMC is three percent, in aqueous solution, any convenient concentration of CMC capable of producing a crushable solid residue may be chosen.

A high-alumina body formed by sintering the above low-fired alumina material is substantially fully dense, is very resistant to chemical attack over substantially the entire pH range (at least from about 0.3 to about 13.5), is substantially non-vitreous (substantially free of a secondary glassy phase), has substantially uniform and linear thermal expansion coefficients, is optically translucent, has high temperature corrosion resistance, and a substantially uniform grain size (see FIGS. 2 and 3). The high alumina material is also resistant to dissolution and/or corrosion from prolonged immersion in molten aluminum.

In still another embodiment of the present invention, the high-alumina powder is formed from a particulate or powdered alumina precursor to which transition metal ions have been added via aqueous solution. An aqueous solution containing a dissolved transition metal, such as from an at least slightly soluble metal salt, carbonate, or the like, is prepared with the transition metal in sufficient concentration such that washing the alumina precursor with the solution deposits transition metal ions on the surface of the alumina particles in predetermined amounts. The alumina powder precursor is then dried. Upon drying, the dissolved transition metal ions become attached (i.e., such as by electrostatic forces) to the surfaces of the alumina particles. The alumina particles are then exposed to for a very brief period of time to a high intensity heat source (such as aspirating the alumina powder through a high intensity flame or laser), reacting the alumina particles with the transition metal ions attached to the surface. Because these "doped" particles are brought to reaction temperature very quickly the reaction can go to completion, since the ionic attachment of the transition metals to each alumina particle thus behaves as a single particle reaction. In other words, the reaction takes place with no need for close proximity to other particles, as is the case of particle-to-particle or solid state reactions.

The number of ions in solution is the mole fraction multiplied by Avagadro's number. The number of particles of an insoluable oxide in an aqueous solution is determined by concentration, particle size, shape, and surface area. Thus, by controlling the above variables (particularly the concentration of the metal salt and the particle surface area), a desired and predetermined small amount of transition metal additive may be attached to each of the aluminum oxide particles. Further, this technique may be used to add transition metal additives or dopants to other insoluble (or substantially less soluble) particulate oxide (or non-oxide) materials. Preferably, the transition metal additives are standardized to be additions of about 1 to 10 weight percent of the alumina powder precursor. More preferably, the transition metal is magnesium which is still more preferably introduced as an aqueous solution of magnesium carbonate dissolved in water.

EXAMPLE 1

A 50 per cent aqueous mixture was made of 95 weight percent calcined alumina and 5 weight percent magnesium carbonate. The magnesium carbonate was allowed to substantially dissolve in the water. The mixture was stirred with a high shear mixer. Substantial thickening was observed when the mixture was allowed to stand overnight, indicating the presence of magnesium hydroxide. The mixture was thoroughly dried and the resultant powder was ball milled with alumina media to produce a fine powder. The powder was rapidly heated by an intense heat source (i.e., aspirated through a gas flame) to form a fired powder. The fired powder was characterized as comprising 95 percent spherical particles having a mean diameter of 8 microns.

EXAMPLE 2

A 50 per cent aqueous mixture was made of 100 weight percent calcined alumina. The mixture was stirred with a high shear mixer. The mixture was thoroughly dried and the resultant powder was ball milled with alumina media to produce a fine powder. The powder was rapidly heated by an intense heat source to form a fired powder. The fired powder was characterized as having irregularly-shaped particles substantially the same size and shape as characteristic of the calcined alumina precursor.

EXAMPLE 3

A 50 per cent aqueous mixture was made of 95 weight percent calcined alumina and 5 weight percent concentrated chromic acid. The chromic acid was allowed to substantially dissolve in the water. The mixture was stirred with a high shear mixer. The mixture was thoroughly dried and the resultant powder was ball milled with alumina media to produce a fine powder. The powder was rapidly heated by an intense heat source (i.e., aspirated through a gas flame) to form a fired powder. The fired powder was characterized as comprising 95 percent spherical particles having a distinctive pink color typical of conventional high-fired aluminas doped with chrome oxide.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A method for producing, a high-alumina body at reduced sintering temperatures, comprising the steps of:
   a) providing an alumina powder precursor;
   b) adding water to the alumina powder precursor;
   c) adding about 1–10 weight percent substantially water soluble magnesia powder precursor to the alumina powder precursor to make an aqueous green powder precursor;
   d) mixing the aqueous green powder precursor;
   e) drying the aqueous green powder precursor to obtain a green powder;
   f) pressing a green body from the green powder;
   g) removing any residual moisture and organic material that may be present from the green body;
   h) firing the green body to about cone 13 to produce a high-alumina body; and
   i) between b) and d), adding a 3 percent aqueous solution of carboxymethylcellulose;
   wherein the green body is fired in air; and
   wherein mixing is accomplished by wet ball milling with alumina media.

2. The method of claim 1 wherein the magnesia powder precursor is magnesium carbonate.

3. The method of claim 1 wherein between about 2 weight percent magnesia and about 6 weight percent magnesia are added.

4. The method of claim 1 wherein the high-alumina body is substantially resistant to dissolution in molten aluminum.

5. The method of claim 1 wherein the high-alumina body is substantially resistant to chemical attack over the pH range from about 0.3 to about 13.5.

6. A method for producing a high-alumina body having enhanced chemical stability at reduced sintering temperatures, comprising the steps of:
   aa) providing an alumina precursor;

bb) adding about 1–10 weight percent substantially water soluble cation source to the alumina precursor to form a pre-mixture;

cc) mixing the pre-mixture to form a mixture;

dd) forming the mixture into a desired shape; and ee) firing the desired shape to produce a substantially non-vitreous high alumina body;

wherein the cation source supplies a cation to the alumina precursor;

wherein the cation is selected from the group consisting of magnesium and chromium; and wherein the substantially non-vitreous high alumina body is part of a metal matrix composite.

7. The method of claim 6 wherein the high alumina body has a substantially uniform grain size.

8. The method of claim 6 wherein the alumina precursor is a powder and wherein the alumina precursor is formed into a desired shape by pressing.

9. The method of claim 6 wherein the alumina precursor is a slurry and wherein the alumina precursor is formed into a desired shape by casting.

10. The method of claim 6 wherein the alumina precursor is a slurry and wherein the alumina precursor is formed into a desired shape by spraying.

11. The method of claim 6 wherein the metal matrix is aluminum.

12. The method of claim 6 wherein the desired shape is fired by rapid passage through a sufficiently intense hot zone.

13. The method of claim 6 wherein the high alumina body is substantially resistant to dissolution in molten aluminum.

14. The method of claim 6 wherein the high alumina body is substantially resistant to chemical attack over the pH range from about 0.3 to about 13.5.

15. A method for producing a high-alumina body having enhanced chemical stability at reduced sintering temperatures, comprising the steps of:

aaa) providing an alumina precursor;

bbb) adding about 1–10 weight percent substantially water soluble cation source to the alumina precursor to form cation added alumina precursor;

ccc) mixing the cation added alumina precursor;

ddd) forming the cation added alumina precursor into a desired alumina shape; and eee) firing the alumina shape to produce a substantially non-vitreous high alumina body;

wherein the cation source supplies a cation to the alumina precursor;

wherein the cation is selected from the group consisting of magnesium and chromium;

wherein the desired alumina shape is fired by rapid passage through a sufficiently intense hot zone;

wherein the cation added alumina precursor is substantially particulate; and wherein the cation added alumina precursor is passed through the hot zone under quasi-weightless conditions.

16. The method of claim 15 wherein the high alumina body is substantially resistant to dissolution in molten aluminum.

17. The method of claim 15 wherein the high alumina body is substantially resistant to chemical attack over the pH range from about 0.3 to about 13.5.

* * * * *